United States Patent
Jiang et al.

(10) Patent No.: US 7,721,195 B2
(45) Date of Patent: May 18, 2010

(54) RTF TEMPLATE AND XSL/FO CONVERSION: A NEW WAY TO CREATE COMPUTER REPORTS

(75) Inventors: Xin Jiang, Foster City, CA (US); Shinji Yoshida, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1125 days.

(21) Appl. No.: 10/925,768

(22) Filed: Aug. 24, 2004

(65) Prior Publication Data

US 2006/0048096 A1 Mar. 2, 2006

(51) Int. Cl.
*G06F 17/00* (2006.01)

(52) U.S. Cl. .................. 715/235; 715/234; 717/123; 455/552.1

(58) Field of Classification Search .................. 715/235, 715/236, 237, 238, 239, 256, 277; 707/4
See application file for complete search history.

(56) References Cited

U.S. PATENT DOCUMENTS

| | | | |
|---|---|---|---|
| 5,537,590 A | 7/1996 | Amado | |
| 5,701,400 A | 12/1997 | Amado | |
| 2004/0153465 A1* | 8/2004 | Singleton et al. | 707/100 |
| 2004/0168119 A1* | 8/2004 | Liu et al. | 715/501.1 |
| 2005/0086584 A1* | 4/2005 | Sampathkumar et al. | 715/501.1 |
| 2007/0136363 A1* | 6/2007 | Thielen | 707/102 |

OTHER PUBLICATIONS

Adler et al, "Extensible Stylesheet Language (XSL) Version 1.0", Oct. 2001, pp. 1-12 , Wide Web Consortium, at URL http://www.w3.org/TR/2001/REC-xsl-20011015/; printed Jul. 8, 2009.

(Continued)

*Primary Examiner*—Stephen S Hong
*Assistant Examiner*—Quoc A Tran
(74) *Attorney, Agent, or Firm*—Townsend and Townsend and Crew LLP

(57) ABSTRACT

A template processor converts an initial template document into an XSL template that can be used to automatically generate reports from report data extracted from a database or other application. Users create initial template documents using a word processor or other rich-text editing application. The initial template document employs the word processor's native formatting features to specify the formatting of report data. The initial template document includes placeholder tags inserted by the user to define the locations of report data in the report. The initial template document also includes transformation tags that dynamically define the content of a report based on the value or quantity of report data. The template processor can include a reader adapted to read portions of the initial template file and a parser adapted to create corresponding XSL code from these portions. The XSL template can be combined with XML-formatted data to create a report.

18 Claims, 4 Drawing Sheets

OTHER PUBLICATIONS

Adobe Systems Incorporated, "PDF Reference, Fourth Edition, Adobe Portable Document, Version 1.5", Aug. 2003, pp. 1-1172, Adobe Systems Incorporated.

Bray et al, "Extensible Markup Language (XML) 1.0 Second Edition," 2000, pp. 1-36, Web Consortium, at URL http://www.w3.org/TR/2000/REC-xml-20001006; printed Jul. 8, 2009.

Clark, "XSL Transformations (XSLT) Version 1.0", Nov. 1999, pp. 1-57, World Wide Web Consortiu, at URL http://www.w3.org/TR/1999/REC-xslt-19991116; printed Jul. 8, 2009.

Microsoft Corporation, "Rich Text Format (RTF) Specification, version 1.6", May 1999, pp. 1-5, Microsoft of Corporation at URL http://msdn.microsoft.com/en-us/library/aa140277(office.10).aspx printed Jul. 8, 2009.

* cited by examiner

RTF TEMPLATE AND XSL/FO CONVERSION: A NEW WAY TO CREATE COMPUTER REPORTS

BACKGROUND OF THE INVENTION

The present invention relates to the field of software applications generally, and specifically to applications for analyzing and publishing data. Enterprises store large amounts of data using databases. Users often create and distribute reports including data from the database to other people within or outside the enterprise. Typically, these reports need to present and summarize the data in a clear and compelling manner. Therefore, users create reports using rich content, including text formatting, tables, and charts. One way of creating rich content reports is to extract the necessary data from the database, create a report in a word-processing, spreadsheet, or other applications, and manually insert the data into the appropriate portions of the report. This approach is time-consuming and error-prone. Additionally, when reports need to be revised with new or updated data, the user must extract the new data from the database and edit the report manually.

One prior approach automates report generation by using a document layout designing language, such as XSL, to create a document template. The document template can then be combined with report data from the database to create a report. If the report data from the database or other application includes metadata such as XML, then reports can be generated automatically anytime data is changed or updated.

One problem with document layout designing languages such as XSL is they are difficult for non-programmers to use. Managers, analysts, and other users within an enterprise do not have the ability to create or edit templates written these languages. As a result, if a user needs to create a template, he or she creates an example or specification of the report that indicates the formatting and the location of report data in the report and sends it to a programmer who then creates the actual template in a document layout designing language. This increases the amount of time and expense needed to create templates used to automate report generation.

It is therefore desirable for a system and method to enable users to create templates used to automatically generate reports without resorting to document layout designing languages. It is further desirable that the system allow users to create templates using common software applications, rather than unfamiliar and specialized software applications.

BRIEF SUMMARY OF THE INVENTION

An embodiment of the invention includes a template processor for converting an initial template document into an XSL template that can be used to automatically generate reports from report data extracted from a database or other software application. Users can create initial template documents using a word processor or other rich-text editing application. The initial template document employs the word processor's native formatting features to specify the formatting of report data. The initial template document includes placeholder tags inserted by the user to define the locations of report data in the report. The initial template document also includes transformation tags that dynamically define the content of a report based on the value or quantity of report data. The template processor can include a reader adapted to read portions of the initial template file and a parser adapted to create corresponding XSL code from these portions. The XSL template can be combined with XML-formatted data to create a report.

In an embodiment, a system for creating a template document defining a report comprises an initial template reader adapted to read a portion of an initial template document created by a user. In an additional embodiment, the initial template document is an RTF file. The initial template reader is adapted to dispatch an event in response to the portion of the initial template document. The event indicates a type associated with the portion. A parser is adapted to receive the event from the initial template reader and to identify a data object type corresponding with the type indicate by the event. The parser is adapted to instantiate a data object of the data object type in a data object hierarchy. In response to the event indicating a type associated with the end of the portion of the initial template document, the parser is adapted to invoke a display method of the data object hierarchy. The display method creates at least a portion of the template document defining the report using a document layout designing language. In a further embodiment, the document layout designing language is XSL.

In another embodiment, the portion of the initial template document includes a placeholder tag specifying the location of report data in the report, a formatting attribute defining the formatting of the report data in the report, or a transformation tag defining a transformation of report data in the report. The transformation tag may specify a portion of the initial template document to be repeated. In a further embodiment, the transformation tag corresponds with a set of XSLT tags.

In an additional embodiment, invoking the display method of the hierarchy of data objects includes invoking a display method of each of the set of data objects in hierarchical order.

BRIEF DESCRIPTION OF THE DRAWINGS

The invention is described with reference to the drawings, in which.

DETAILED DESCRIPTION OF THE INVENTION

Figure 1:
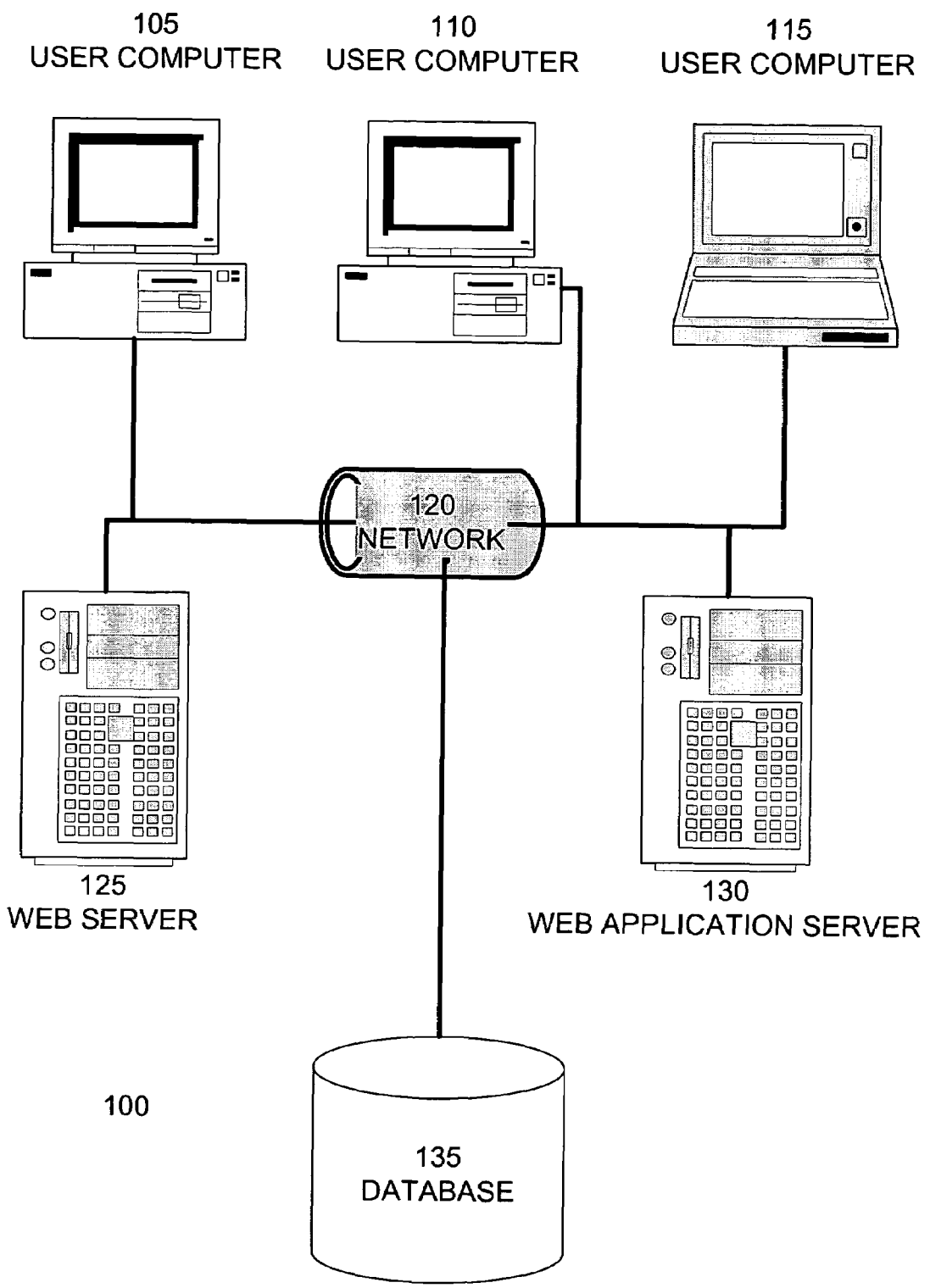
FIG. 1 is a block diagram of a system for implementing an embodiment of the invention.

FIG. 1 is a block diagram of a system 100 for implementing an embodiment of the invention. System 100 includes user computers 105, 110, and 120. User computers 105, 110, and 120 can be general purpose personal computers having web browser applications. Alternatively, user computers 105, 110, and 120 can be any other electronic device, such as a thin-client computer, Internet-enabled mobile telephone, or personal digital assistant, capable of displaying and navigating web pages or other types of electronic documents. Although system 100 is shown with three user computers, any number of user computers can be supported.

A web server 125 is used to process requests for web pages or other electronic documents from user computers 105, 110, and 120. In an embodiment of the invention, the data analysis software operates within a web browser on a user computer. In this embodiment, all user interaction with the data analysis software is via web pages sent to user computers via the web server 125.

Web application server 130 operates the data analysis software. In an embodiment, the web application server 130 is one or more general purpose computers capable of executing programs or scripts in response to the user computers 105, 110 and 115. The web application can be implemented as one or more scripts or programs written in any programming language, such as Java™, C, or C++, or any scripting language, such as Perl, Python, or TCL.

In an embodiment, the web application server 130 dynamically creates web pages for displaying the data analysis software. The web pages created by the web application server 130 are forwarded to the user computers via web server 125. Similarly, web server 125 receives web page requests and input data from the user computers 105, 110 and 120, and forwards the web page requests and input data to web application server 130.

The data analysis application on web application server 130 processes input data and user computer requests and can be stored or retrieved data from database 135. Database 135 stores data created and used by the enterprise. In an embodiment, the database 135 is a relational database, such as Oracle 9i, that is adapted to store, update, and retrieve data in response to SQL format commands.

An electronic communication network 120 enables communication between computers 105, 110, and 115, web server 125, web application server 130, and database 135. In an embodiment, network 120 may further include any form of electrical or optical communication devices, including wireless and wired networks. Network 130 may also incorporate one or more local-area networks, such as an Ethernet network; wide-area networks, such as the Internet; and virtual networks, such as a virtual private network.

The system 100 is one example for executing a data analysis software according to an embodiment of the invention. In another embodiment, web application server 130, web server 125, and optionally database 135 can be combined into a single server computer system. In alternate embodiment, all or a portion of the web application functions may be integrated into an application running on each of the user computers. For example, a Java™ or JavaScript™ application on the user computer is used to retrieve or analyze data and display portions of the data analysis application.

An embodiment of the invention enables users to create templates in a document layout designing language using an ordinary word-processing application. An example of a document layout designing language is the extensible stylesheet language, or XSL. XSL is an XML-based language for defining the formatting and transformation of data in documents. XSL includes two different standards: XSLT and XSL-FO. XSLT defines the transformation of report data in a document. XSLT allows report data to modified, sorted, filtered, or combined in a document. Additionally, XSLT can specify transformations and logic operations to dynamically define the content of a report. For example, XSLT can be used to add, delete, duplicate, or format portions of a report based on the amount and values of report data used for a given instance of a report. XSL-FO defines the formatting of the report, including colors, fonts, and the arrangement of report data. Additional details on XSL can be found in the document "Extensible Stylesheet Language (XSL), Version 1.0, W3C Recommendation 15 Oct. 2001," located at http://www.w3.org/TR/2001/REC-xsl-20011015/, which is incorporated by reference herein.

In one embodiment, a user creates an initial template document in a word-processor defining the appearance and the static content of the report. Static content can be text, images, or other content to be included in the report, such as standard text for headers and footers, introductory or explanatory text, watermarks or logos, and heading text for charts and tables.

The formatting features of the word-processor are used to specify the desired formatting of both static content and report data in the report. For example, if a user applies bold formatting to a text block, then the report will include the text block with bold formatting. If the text block includes a placeholder tag, discussed below, for report data, then when the report data is inserted into the report, the report data will be bold formatted as well. Examples of the formatting specified by the user with a word processor include the size, font, and alignment of text; bullets and numbering; colors; borders around paragraphs; watermarks; embedded images; tables; and headers and footers.

In addition to defining the formatting and static content in the initial template document, the users uses the initial template to define the location of report data in the report. The user adds text "tags" as placeholder tags to the initial template document to specify the location for data. In an embodiment, each tag corresponds to an XML data type associated with report data extracted from the database or other application to be included with the report. The location of a placeholder tag corresponds to the location of the report data in the report. For example, if the report data includes an XML element "VendorName," which may state the name of a vendor, then adding a tag "<?VendorName?>" to the initial template document specifies the location of XML element "VendorName" in the report. Furthermore, each instance of a placeholder tag "VendorName" in the initial template specifies an instance of the corresponding XML element in the report.

In addition to placeholder tags, users may also include transformation tags specifying transformations to be performed on report data. Transformation tags may be used to modify, sort, filter, or combine report data in a report. Additionally, transformation tags specify transformations and logic operations to dynamically define the content of a report, such as adding, deleting, duplicating, or formatting portions of the report based upon the quantity and value of report data. Transformation tags can also be used to create charts, graphs, or other visual summaries of report data. For example, if an initial template defines the formatting of a single contact entry, then transformation tags added to the template can be used to indicate that the report should format any number of contact entries included in the report data in an identical manner. In an embodiment, the transformation tags are simplified versions of XSLT tags. Table 1 lists an example set of transformation tags and their XSLT equivalents.

| XSL Element | Transformation Tag |
|---|---|
| <xsl:value-of select="name"> | <?name?> |
| <xsl:apply-templates select="name"> | <?apply:name?> |
| <xsl:copy-of select="name"> | <?copy-of:name?> |
| <xsl:call-template name="name"> | <?call:name?> |
| <xsl:sort select="name"> | <?sort:name?> |
| <xsl:for-each select="name"> | <?for-each:name?> |
| <xsl:choose> | <?choose?> |
| <xsl:when test="exp"> | <?when:exp?> |
| <xsl:if test="exp"> | <?if:exp?> |
| <xsl:template name="name"> | <?template:name?> |
| <xsl:variable name="name"> | <?variable:name?> |
| <xsl:import href="url"> | <?import:url?> |
| <xsl:include href="url"> | <?include:url?> |
| <xsl:stylesheet xmlns:x="url"> | <?namespace:x=url?> |

The transformation indicated by a transformation tag often needs to be applied only to a portion of a report. For example, a contact entry would be repeated for each contact report data extracted from the database, but the title and introductory text need only be stated once. To specify a portion of the report affected by a transformation tag, an end tag is appended to the end of the portion. For example, a portion to be repeated for each XML element of a type could be initialized by the tag "<?for-each:name?>" and ended by the tag "<?end for-each?>." Additionally, tags may be nested to define multiple levels of transformation hierarchies. In this case, each end tag indicates the end of the current level of hierarchy.

Following the creation of an initial template document, including the addition of placeholder and transformation tags, the user saves the initial template document. The initial template document can be saved in any file format capable of representing rich text data, such as the rich text format (RTF).

Figure 2:
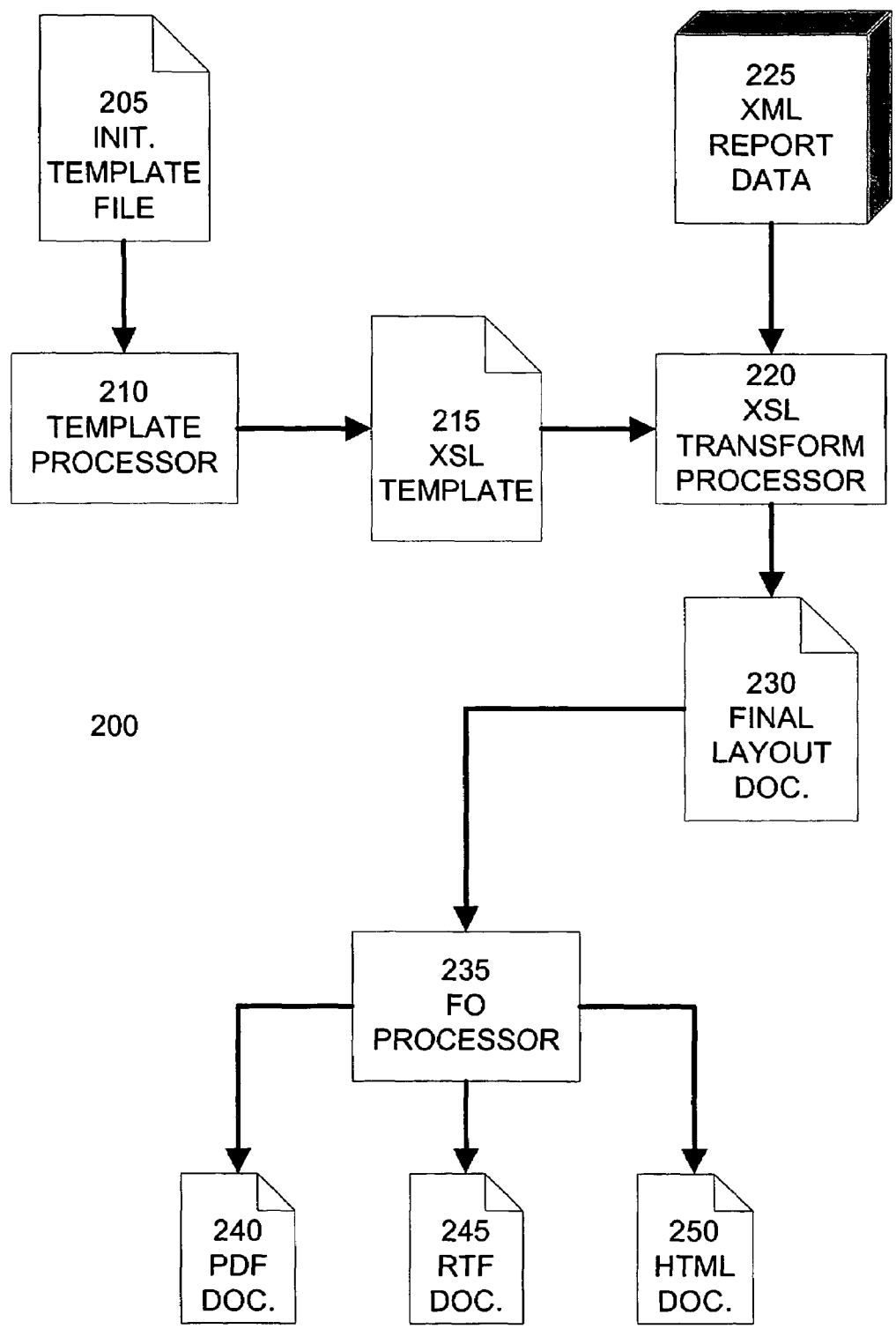
FIG. 2 illustrates the use of an embodiment of the invention to publish documents.

FIG. 2 illustrates the use of an embodiment of the invention to publish documents. To create and publish a report, the user sends the initial template document and the report data to be used in the report to system 200. As discussed above, the initial template document 205 can be saved in any file format capable of representing rich text data, such as the RTF file format.

The template processor 210 converts the initial template document 205 into a template file in a document layout designing language, such as XSL. As discussed in detail below, the template processor 210 reads the initial template document, parses the static content, formatting information, placeholder tags, and transformation tags created by the user with a word-processor, and converts this information to its equivalent XSL representation. The output of the template processor 210 is a template 215 expressed in a document layout designing language, such as XSL using XSLT and XSL-FO.

The XSL template 215 can then be used to automatically create reports from XML report data. XSL transform processor 220 receives a set of XML-formatted report data 225 from a database or other application. The XSL transform processor 220 applies the transformations and formatting specified by the XSL template 215 to the XML-formatted report data 225 to create a final layout document 230. The final layout document 230 includes all of the report data arranged and formatted according to the XSL template 215. In the final layout document 230, the report data is transformed and inserted into the report as specified by the XSL template 215, leaving only the report data and static content and their associated formatting information, expressed for example as XSL-FO attributes. The XSL template 215 can be reused with multiple sets of XML-formatted data to create additional reports with similar formatting.

FO processor 235 receives the final layout document 230, applies the formatting specified to the report data and static content, and outputs a formatted report. The FO processor 235 can output a formatted report in any number of data formats, including PDF documents, 240, RTF documents, 245, and/or HTML documents, 250. The FO processor 235 may interpret formatting information differently based on the output data format to optimize the appearance of the formatted report. For example, the FO processor 235 may alternately render a chart in a bitmap or vector image format to match the resolution and capabilities of the output format.

Figure 3:
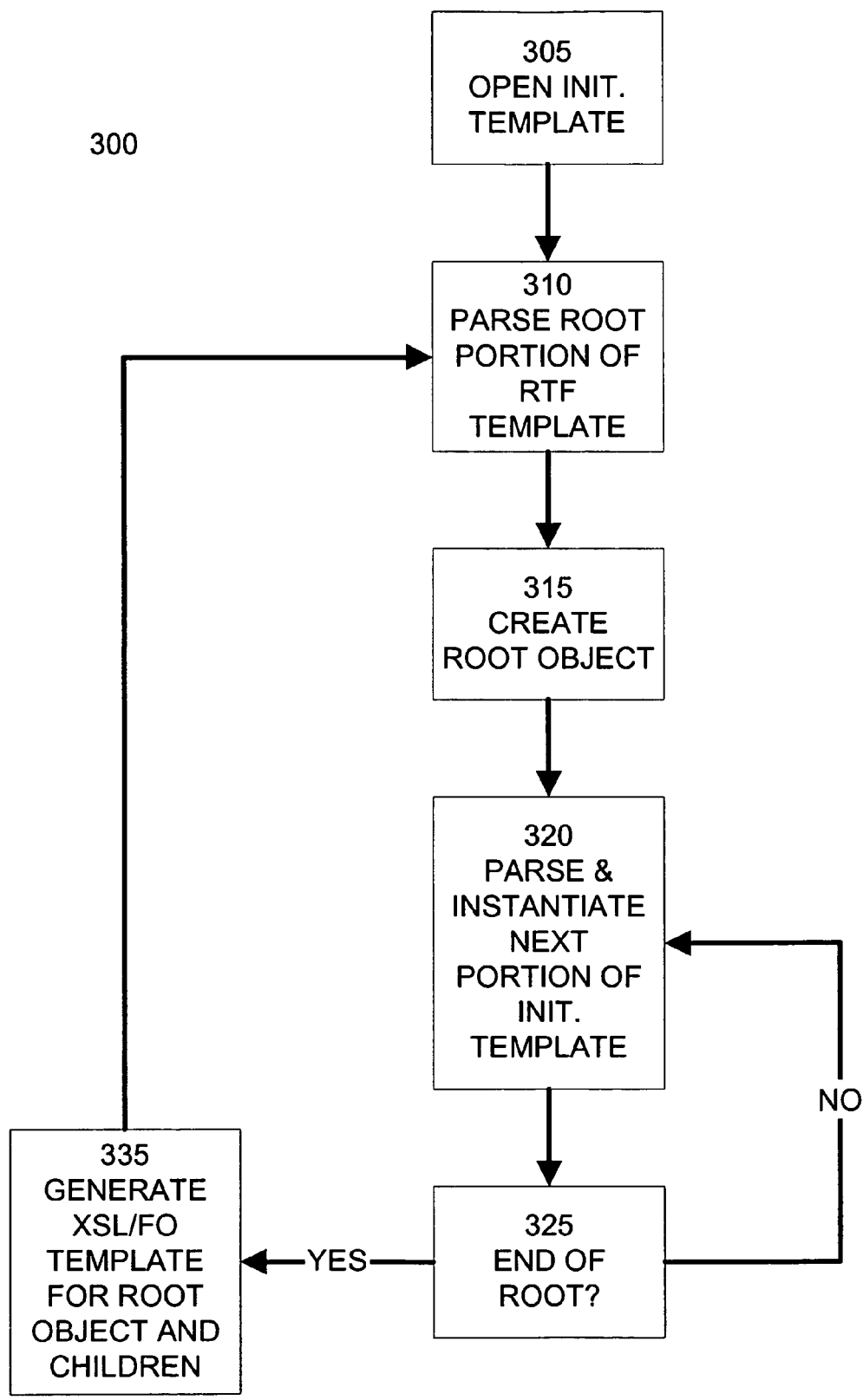
FIG. 3 is a flowchart illustrating a method of creating a XSL template according to an embodiment of the invention.

FIG. 3 is a flowchart 300 illustrating a method of creating a XSL template according to an embodiment of the invention. In an embodiment, the method of flowchart 300 is performed by a template processor, such as template processor 210 discussed above. At step 305, an initial template document created by a user is opened, and an initial portion of the template document is read. Step 310 parses the root portion of the initial template document. In an embodiment, a root portion is indicated by a new paragraph block in the initial template document.

At step 315, a root object corresponding with the root portion of the initial template is created. The root object is a data object including methods for instantiating child objects, for setting one or more attributes, and for creating code in a document layout designing language expressing the attributes of the data object. In an embodiment, the data object is a Java™ bean. Step 315 creates the root object and sets its attributes according to the root portion of the initial template. For example, if the root portion of the initial template is a new paragraph block using a boldface, 14 point font, then step 315 will create a root object corresponding with the new paragraph block and set its attributes to specify formatting that includes using a boldface, 14 point font. As discussed in detail below, when a display method of the root object is invoked, the root object will output code in a document layout designing language, such as XSL, specifying a new paragraph block using a boldface, 14 point font.

Similar to steps 305-315, step 320 will retrieve and parse the next portion of the initial template document. In an embodiment, each portion of the initial template document corresponds with a placeholder or transformation tag, a block of static content, or a formatting attribute in the initial template document. For the next portion of the initial template document, step 320 will instantiate a child object of the root object. Like the root object, the child object corresponds with the next portion of the initial template document and including methods for instantiating child objects, for setting one or more attributes, and for creating code in a document layout designing language expressing the attributes of the child object.

Step 325 determines whether the end of the root portion in the initial template document has been reached. In an embodiment, an end of paragraph marker in the initial template document indicates the end of the root portion. If the end of the root portion has not been reached, step 320 is repeated for another portion of the initial template document. In an embodiment, the initial template document expresses data in a hierarchical format. In this embodiment, child objects instantiated by step 320 may be children to the root object or to a previously create child object.

Conversely, if step 325 determines that the end of the root portion in the initial template document has been reached, step 335 invokes a display method of the root object. The display method generates code in a document layout designing language, such as XSL, expressing the attributes of the object. The root object invokes the display method of each of its child objects, so that code is generated expressing all of the attributes of all of the child objects. In an embodiment, the invoking the display methods of the root object and its children are invoke in hierarchical order, thus preserving the hierarchy of data from the initial template document. The code output by objects in step 335 is appended to any previously generate code and stored as the template document, for example the XSL template document 215. A further embodiment of step 335 then discards the root and child objects to conserve memory.

If the end of the initial template document has not been reached, then the method of flowchart 300 proceeds to step 310 to retrieve and parse an additional root portion in the initial template document. Steps 315-335 are then repeated as described above to process the additional root object and any child objects.

Figure 4:
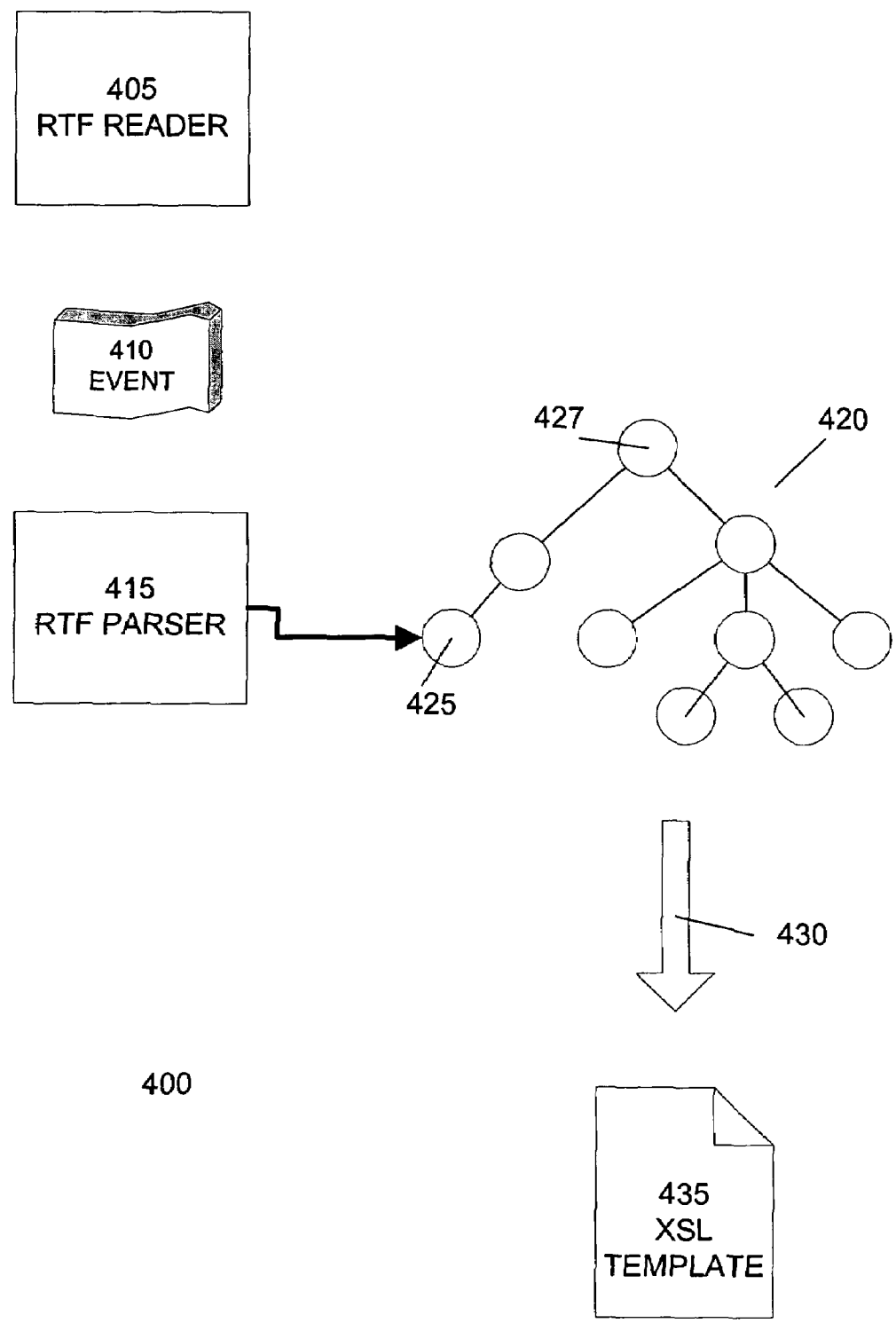
FIG. 4 illustrates a system for creating a XSL template according to an embodiment of the invention.

FIG. 4 illustrates a system 400 for creating a XSL template according to an embodiment of the invention. System 400 includes a RTF reader 405 for reading and processing portions of an initial template document in the RTF data format. In alternate embodiments, RTF reader 405 can be modified to read and process data from any other document format, including common word-processor file formats. RTF reader 405 incrementally reads portions of the initial template document. In an embodiment, each portion of the initial template document corresponds with a placeholder or transformation tag, a block of static content, or a formatting attribute in the initial template document.

For each portion, RTF reader 405 dispatches an event 410 to RTF parser 415. Each event 410 includes the type and attributes of the portion read by the RTF reader 405. RTF parser 415 receives each event 410. In response to an event 410, RTF parser 415 determines the appropriate type of object to be created, the attributes of the object, and the parent of the object, if any. In an embodiment, attributes of an object may be determined not only from the information in the event 410, but also from the attributes of parent objects. An embodiment of the RTF parser 415 uses a stack data structure to store attributes and other information associated with different levels in the hierarchy of objects 420.

RTF parser 415 then instantiates the object in the appropriate location in the hierarchy of objects 420. For example, RTF parser 415 can instantiate object 425 as the grandchild of root object 427 in the hierarchy of objects 420. In a further embodiment, the RTF parser 415 uses object introspection to locate the appropriate method for instantiating the object.

When the RTF reader 405 encounters the end of the root portion in the initial template document, for example by reading an end of paragraph marker in the initial template document, the RTF reader 405 dispatches an event 410 to the RTF parser 415 indicating the end of the root portion. In response to this event, the RTF parser 415 invokes the display methods of all of the objects in the hierarchy of objects 420. In an embodiment, RTF parser 415 invokes the display method of root object 427, which then invokes the display methods of its child objects in hierarchical order.

The outputs 430 of the display methods of the hierarchy of objects 420 is then appended to any previously generate code and stored as the template document, for example the XSL template document 435.

In an embodiment, system 400 executes the RTF reader 405 and RTF parser 415 in separate threads of execution. This allows the RTF reader 405 and RTF parser 415 to operate in parallel, thereby improving system performance. To further improve performance, an embodiment of the RTF parser 415 caches keywords from received events and their associated methods used to instantiate the corresponding objects. When the RTF parser 415 receives an event, it first uses the keywords in the event to attempt to locate the associated method in the cache. If the keyword has been previously cached by the RTF parser 415, it uses the cached method to instantiate the object corresponding with the received event. If the keyword has not been cached, then other methods such as object introspection can be used to locate the associated method. Once a method has been located using other methods, the RTF parser 415 adds the method to its cache. The RTF parser 415 can cache keywords and associated methods using any type of data structure, including a hash table.

In an additional embodiment, the system 400 can further process the completed XSL template 435 to improve performance of the FO processor. For many XSL templates, the majority of the data will be XSL-FO attributes. Additionally, similar or identical groups of XSL-FO attributes are typically repeated many times throughout an XSL template. For example, a report may include a number of paragraphs with identical formatting. To improve FO processing performance, system 400 identifies all of the distinct groups of formatting tags in the XSL template 435. For the most frequently occurring groups, system 400 creates new custom tags corresponding with these groups. The system 400 then substitutes custom tags for each occurrence of a group of attributes in the XSL template document 435. The system 400 also inserts the definitions of the custom tags into the XSL template document 435.

For example, if the attributes "new paragraph," "bold," and "Arial font" occur together frequently in an XSL template document, then system 400 defines a custom tag "id1" corresponding with this common grouping of attributes, substitutes the custom tag "id1" for each occurrence of the group of attributes "new paragraph," "bold," and "Arial font" in the XSL template document, and inserts the definition "id1='new paragraph,' 'bold,' and 'Arial font'" in the XSL template document. The resulting optimized XSL template 435 is then output by system 400.

It should also be noted that the present invention is not limited to creating XSL template documents from initial template files. In yet a further embodiment, the display methods associated with the data objects can be used to create code in any format that can be used to define a template for arranging, transforming, and/or formatting data from a database or other application. Thus, the scope of the invention is to be determined solely by the claims.

What is claimed is:

1. A method comprising:
receiving, by a computer system from a user, a first template document expressed in Rich Text Format (RTF);
reading, by an RTF reader executing on the computer system, a first portion of the first template document;
dispatching, by the RTF reader, a first event to an RTF parser executing on the computer system, the first event including a type and one or more attributes associated with the first portion;
instantiating, by the RTF parser, a root data object based on the type and one or more attributes included in the first event, wherein the root data object includes a display method for outputting source code in Extensible Stylesheet Language (XSL);
reading, by the RTF reader, a second portion of the first template document, wherein the second portion corresponds to a placeholder tag, a transformation tag, a block of static content, or a formatting attribute in the first template document;
dispatching, by the RTF reader, a second event to the RTF parser, the second event including a type and one or more attributes associated with the second portion;
instantiating, by the RTF parser, a child data object based on the type and one or more attributes included in the second event, wherein the child data object is instantiated as a child of the root data object in an object hierarchy, and wherein the child data object includes a display method for outputting source code in XSL;
generating, by the RTF parser, a second template document expressed in XSL by invoking the display method included in the root data object and the display method included in the child data object; and
combining, by the computer system, the second template document with report data to generate a report.

2. The method of claim 1, wherein the placeholder tag specifies a location for report data, wherein the formatting attribute specifies formatting of report data, and wherein the transformation tag specifies a transformation to be performed on report data.

3. The method of claim 2, wherein the transformation tag specifies a repetition of report data.

4. The method of claim 2, wherein the transformation tag specifies a visual summary of report data.

5. The method of claim 2, wherein the formatting attribute is implicitly defined using formatting features of a word-processing application.

6. The method of claim 1, wherein invoking the display method included in the root data object causes the display method included in the child data object to be automatically invoked.

7. A system comprising:
a database configured to store a first template document expressed in Rich Text Format (RTF), the first template document being created by a user; and
a server computer in communication with the database and adapted to execute an RTF reader and an RTF parser, the server computer being configured to:
read, using the RTF reader, a first portion of the first template document;
dispatch, using the RTF reader, a first event to the RTF parser, the first event including a type and one or more attributes associated with the first portion;
instantiate, using the RTF parser, a root data object based on the type and one or more attributes included in the first event, wherein the root data object includes a display method for outputting source code in Extensible Stylesheet Language (XSL);
read, using the RTF reader, a second portion of the first template document, wherein the second portion corresponds to a placeholder tag, a transformation tag, a block of static content, or a formatting attribute in the first template document;
dispatch, using the RTF reader, a second event to the RTF parser, the second event including a type and one or more attributes associated with the second portion;
instantiate, using the RTF parser, a child data object based on the type and one or more attributes included in the second event, wherein the child data object is instantiated as a child of the root data object in an object hierarchy, and wherein the child data object includes a display method for outputting source code in XSL;
generate, using the RTF parser, a second template document expressed in XSL by invoking the display method included in the root data object and the display method included in the child data object; and
combine the second template document with report data to generate a report.

8. The system of claim 7, wherein the placeholder tag specifies a location for report data.

9. The system of claim 7, wherein the formatting attribute specifies formatting of report data.

10. The system of claim 7, wherein the transformation tag specifies a transformation to be performed on report data.

11. The system of claim 10, wherein the transformation tag specifies a repeated repetition of report data.

12. The system of claim 7, wherein invoking the display method included in the root data object causes the display method included in the child data object to be automatically invoked.

13. An information storage medium having stored thereon program code executable by a computer system, the program code comprising:
code that causes the computer system to receive from a user a first template document expressed in Rich Text Format (RTF);
code that causes the computer system to read, via an RTF reader, a first portion of the template document;
code that causes the computer system to dispatch, via the RTF reader, a first event to an RTF parser executing on the computer system, the first event including a type and one or more attributes associated with the first portion;
code that causes the computer system to instantiate, via the RTF parser, a root data object based on the type and one or more attributes included in the first event, wherein the root data object includes a display method for outputting source code in Extensible Stylesheet Language (XSL);
code that causes the computer system to read, via the RTF reader, a second portion of the first template document, wherein the second portion corresponds to a placeholder tag, a transformation tag, a block of static content, or a formatting attribute in the first template document;
code that causes the computer system to dispatch, via the RTF reader, a second event to the RTF parser, the second event including a type and one or more attributes associated with the second portion;
code that causes the computer system to instantiate, via the RTF parser, a child data object based on the type and one or more attributes included in the second event, wherein the child data object is instantiated as a child of the root data object in an object hierarchy, and wherein the child data object includes a display method for outputting source code in XSL;
code that causes the computer system to generate, via the RTF parser, a second template document expressed in XSL by invoking the display method included in the root data object and the display method included in the child data object; and
code that causes the computer system to combine the second template document with report data to generate a report.

14. The information storage medium of claim 13, wherein the placeholder tag specifies a location for report data, wherein the formatting attribute specifies formatting of report data, and wherein the transformation tag specifies a transformation to be performed on report data.

15. The information storage medium of claim 14, wherein transformation tag specifies a repetition of report data.

16. The information storage medium of claim 14, wherein the transformation tag specifies a visual summary of report data.

17. The information storage medium of claim 14, wherein the formatting attribute is implicitly defined using the formatting features of a word-processing application.

18. The information storage medium of claim 13, wherein invoking the display method included in the root data object causes the display method included in the child data object to be automatically invoked.

* * * * *

UNITED STATES PATENT AND TRADEMARK OFFICE
CERTIFICATE OF CORRECTION

| | | |
|---|---|---|
| PATENT NO. | : 7,721,195 B2 | Page 1 of 1 |
| APPLICATION NO. | : 10/925768 | |
| DATED | : May 18, 2010 | |
| INVENTOR(S) | : Xin Jiang et al. | |

It is certified that error appears in the above-identified patent and that said Letters Patent is hereby corrected as shown below:

Title Page; item (56);
On page 2, in column 2, under "Other Publications", line 2, delete "Consortiu," and insert -- Consortium, --, therefor.

In column 3, line 60, delete "xs1" and insert -- xsl --, therefor.

In column 9, line 57, in claim 11, after "a" delete "repeated".

In column 10, line 49, in claim 15, after "wherein" insert -- the --.

Signed and Sealed this
Twenty-sixth Day of July, 2011

David J. Kappos
*Director of the United States Patent and Trademark Office*